United States Patent Office 2,849,319
Patented Aug. 26, 1958

2,849,319

COATED FOOD PRODUCT AND COATING COMPOSITION THEREFOR

Ritchard C. Weinmann, Chestnut Hill, Mass., and Richard A. Cotton, Nashua, N. H.

No Drawing. Application June 1, 1954
Serial No. 433,838

30 Claims. (Cl. 99—169)

This invention relates in general to food products, particularly to prepared meat products, such as smoked meats and sausage products and more specifically to such products which have been treated to preserve the same. This invention also relates to preservative coating compositions for coating such products. The present application is a continuation-in-part of the inventors' co-pending application Serial No. 398,894, filed December 17, 1953, and now abandoned.

While smoked or spiced meats such as ham and the various sausage products such as bologna and liverwurst, do, when kept under refrigeration, remain in edible condition for some time, they nevertheless undergo a gradual loss of moisture and deteriorate in flavor, color and appearance. In the past such products have been treated in a variety of methods to prevent this deterioration and loss of moisture.

One known method for treating such products comprises coating the same with a wax coating. However, such coatings become brittle at low temperatures, melt on contact with heat, can be easily scratched or dented and cannot withstand the necessary handling from the factory to the consumer. Furthermore, the appearance of a wax coated food product is unsatisfactory due to the lack of transparency of the wax.

Another means for preventing deterioration and loss of moisture of food products is by placing the same in a moisture-proof plastic bag or other container. However, any slight tear in the plastic bag exposes the entire surface of the meat product to the deteriorating effect of the atmosphere. In most cases such plastic bag or container detracts from the appearance of the food product. Furthermore, such bag or container must be opened to use part of the product, thereupon losing its protective value with respect to the remaining part of the product. Furthermore, in many cases, air is trapped within the container and accelerates deterioration of the food product. This can be avoided by vacuum packing. However, the use of vacuum packing has the disadvantages of being relatively expensive and of drawing moisture to the surface of the product. Surface moisture accelerates the formation of mold in the event that there is any rupture of the bag.

Wrapping such products in sheets of plastic material, the edges of which are heat sealed, has all the disadvantages of the plastic bag or container referred to above.

Another means for treating such products comprises coating the same with a gelatin coating. However, such coatings are generally brittle, low in moisture-proofness and transparency, and accelerate bacteria growth. To render such coatings more suitable relatively expensive and involved laminating procedure is required.

The general object of this invention is to produce a food product, especially a prepared meat product, which is completely encased in a continuous substantially airtight and moisture-proof coating, the coating preferably conforming closely to the surface of the meat so as to eliminate air pockets. Another object is to provide a coating material which can be easily applied without expensive equipment, which is sufficiently low in toxicity to pass Government standards, which forms a transparent, tough, flexible and abrasion-resistant coating on the food, and which does not adversely affect the character and appearance of the food or impart any objectionable flavor or odor. Other objects and advantages will be apparent from the description which follows.

The term "food products" and "meat products" as used herein include food products and meat products encased or non-encased in a porous casing. For example, the term "meat products" refers to skinless frankfurters, as well as frankfurters having casings, and also includes, but is not limited to, prepared smoked meats, such as ham, tongues, and the like, and prepared sausage products, such as liverwurst, bologna, frankfurters, and the like.

It has been discoveed that by applying to such food products, in the form of an aqueous emulsion, a copolymer of a vinylidene chloride, particularly 1,1 dichloro ethylene, and a vinylidene cyanide, particularly acrylonitrile, thereafter drying the emulsion which adheres to the surface of the product and applying heat thereto, a continuous, cohesive, air-tight, moisture-proof coating, closely conforming to and in intimate contact with the surface of the food product is formed. Preferably the copolymer comprises from 70 to 90 percent of 1,1 dichloro ethylene and from 10 to 30 percent of acrylonitrile and is plasticized with a plasticizer of low toxicity, the proportion of such plasticizer ranging from 1 part plasticizer to between about 2.5 to 9 parts copolymer. Such coating is thin and transparent but has sufficient strength and elasticity so that it is not ruptured by ordinary handling. Furthermore, it is non-toxic, antiseptic, odorless, sufficiently inert so that it does not impart any undesirable flavor to the meat and is resistant to oils and liquids with which the meat might accidentally come in contact. It retains its strength and flexibility as well as its other favorable characteristics over a wide range of temperatures, and although it is in intimate contact with the surface of the food product, it can be readily peeled off when desired without marring such surfaces. A string, tab or label may be imbedded in the coating to facilitate peeling. This coating, in contrast to wax coatings heretofore used, is highly abrasion-resistant, springs back into shape after momentary pressure and is not adversely affected by temperatures ranging from below freezing to about 300° F. The coating fits tightly and clings to the surface of the product thereby expelling all air from such surface and leaving no air spaces between the film and the product and no air pockets in which bacteria might develop. This is accomplished without using an expensive vacuum procedure as in the case of plastic bags and containers. In the event that such coating is ruptured in one particular place, only that portion of the surface of the food product which is directly under such torn portion is exposed to the atmosphere, whereas the remainder of the surface of the product remains protected. This is due to the fact that the coating is in intimate contact with the surface of the product. Furthermore, after a portion of the food product is cut off, as for example, when a portion of a bologna is sliced, the remaining portion remains protected from the atmosphere. If desired, coloring material may be added to the emulsion, so that the resulting coating is colored to further enhance the appearance of the food. Food products coated with the material here described remain in edible condition for considerable periods, even without refrigeration, and will retain their original moisture content, flavor and appearance indefinitely under refrigeration. In accordance with the present invention, the food is first prepared in the usual way.

The coating material is prepared and applied as described in the following examples:

Example I 1.0 part of alkyl aryl polyether alcohol (sold under the trade name Triton X–100), 0.2 part of ammonium persulfate and 42.5 parts of water were placed in a vessel having a reflux condenser and high speed stirrer and mixed until complete solution was achieved. A mixture of 30 parts of 1,1 dichloroethylene, 8 parts of acrylonitrile and 6 parts of 2-ethylhexyl diphenyl phosphate (Santicizer 141) was added to the vessel. The contents of the vessel were then thoroughly mixed by the high speed stirrer and while being so mixed there was added a solution of 0.1 part of sodium bisulfite in 2.0 parts of water. Stirring was continued for three hours while the temperature of the batch was maintained between 30° C. and about 35° C., whereby the 1,1 dichloroethylene and the acrylonitrile were emulsion copolymerized and an aqueous emulsion of the resulting copolymer was formed. 5 parts of di-isobutyl adipate, 4 parts of water, 0.5 part of ammonium hydroxide (14% aqueous solution), 0.5 part of a 10% by weight solution of hydroxyethyl cellulose in water and 0.2 part of alkyl aryl polyether alcohol (sold under the trade-name Triton X–100) were mixed for ten minutes in an open vessel with a high speed stirrer. A second emulsion was formed. The second emulsion was blended with the first emulsion with a low speed mixer to form the final emulsion.

This coating material was applied to food products of various kinds by dipping the products in the material, or spraying, showering or brushing the material on to the product and thereafter drying the coating and then subjecting it to heat to consolidate the coating into a continuous film, according to the process described in the inventors' copending application Serial No. 433,839 filed June 1, 1954.

Example II

A second coating composition was prepared in the exact manner referred to in Example I, except that in forming the second emulsion, a mixture of 5 parts of dibutyl sebacate, 0.2 part of Triton X–100, 1.0 part of polyvinyl alcohol (10% by weight solution in water) and 4.0 parts of water were used.

A coating emulsion prepared according to these examples when consolidated at a temperature above 150° F. produces a coating about 1/1000 of an inch thick, which is highly transparent, closely conforms to the surface contour of the product, and is tough, flexible, and air and moisture-proof. The coating has adequate strength to withstand ordinary handling in shipment and storage, and is highly abrasion-resistant, but may be readily slit and peeled off when the food is to be used. The coating does not become brittle at low temperatures or melt at temperatures as high as 300° F. Furthermore, the coating conforms intimately to the surface irregularities of the food product so that, if the coating is cut or torn, only the portion immediately surrounding the torn area is exposed to mold and deterioration.

Although the examples above refer to a particular vinylidene chloride, namely, 1,1 dichloro vinylene, any vinylidene chloride such as vinyl chloride is also suitable. It is understood that the term "vinylidene" as used in the present specification and claims refers to the group $CH_2=C<$, and includes the vinyl group $CH_2=CH<$.

In place of the acrylonitrile in the example, any unsubstituted or lower alkyl (between 1 and 5 carbon atoms) alpha substituted vinyl cyanide, as for example, alpha-methyl vinyl cyanide can be used. The case of a copolymer of a vinylidene chloride and a vinylidene cyanide is greatly preferred, but it is understood that any solid copolymer of a vinylidene chloride and any other vinylidene compound can be used.

The vinylidene chloride-vinyl cyanide copolymer may contain from 5% to 95% vinylidene chloride, the remaining percentage being acrylonitrile or any other lower alkyl alpha substituted vinyl cyanide. Preferably the copolymer should contain from about 70 to 90% of a vinylidene chloride such as 1,1 dichloro ethylene and from about 10 to 30% of a vinyl cyanide such as acrylonitrile.

Although the examples disclose the use of particular copolymerization catalysts, such as ammonium persulfate and sodium bisulfite, other conventional polymerization catalysts, promoters or activators may be utilized, which will not cause the resultant emulsion to impart toxicity to the coated food product. Furthermore, any known type of emulsion polymerization can be used to form the coating emulsion of the present invention. It is not necessary that the polymerization be carried out by an emulsion polymerization. It is within the scope of the present invention to form a copolymer and thereafter form an aqueous emulsion of the same.

Instead of the dibutyl adipate, 2-ethylhexyl diphenyl phosphate and dibutyl sebacate, plasticizers used in the examples, any plasticizer which is compatible with the copolymer and has a low degree of toxicity can be used in forming the coating compound. In particular, any plasticizer which has been approved by the U. S. Department of Agriculture for use in rubber or synthetic resins intended for contact with federally inspected food products has a sufficiently low degree of toxicity for use in the present invention. Such plasticizers include ethyl phthalyl ethyl glycolate, p-tertiary butyl phenyl salicylate, 3-(2-xenoxy) 1,2-epoxypropane, 2-ethylhexyl diphenyl phosphate, butyl phthalyl butyl glycolate, glycerol monooleate, acetyl tributyl citrate, di-iso butyl adipate, butyl stearate, glycerol, dibutyl sebacate and sorbitol. Preferred plasticizers are dibutyl sebacate, di-isobutyl adipate, 2-ethylhexyl diphenyl phosphate, or any combination of the aforesaid.

The proportion of plasticizer to copolymer should be no greater than 1 part of plasticizer for each 2.5 parts of copolymer, since most plasticizers, even those approved by the U. S. Department of Agriculture, have some degree of toxicity, and higher proportions of plasticizer tend to increase the penetration of said plasticizer into the food product. Furthermore, greater amounts of plasticizer render the finished coating tacky and less moisture-proof. The minimum amount of plasticizer should be about one part of plasticizer to about 9 parts of copolymer. This minimum proportion is dictated by the fact that less plasticizer will cause the coating to be more brittle. A preferred proportion of plasticizer ranges from about one part of plasticizer to between about 3.0 and 4.5 parts of copolymer.

Instead of the Triton X–100 set forth in the examples, any conventional non-ionic emulsifying agent can be used, such as an aromatic polyethylene glycol ether (sold under the trade name Antarox-A400), or a fatty alcohol sulfate (sold under the trade name Duponol M. E.). Sufficient emulsifier should be used to form a stable emulsion. The amount of emulsifier required to form a stable emulsion may be determined by routine experiment. Greater quantities of emulsifier should be avoided since they cause the coating to be hygroscopic, whereby it then tends to pick up moisture, which causes a slight reemulsification of the coating, resulting in cloudiness and tackiness. Also, an excess of emulsifier may impart a bitter or soapy taste to the product. The amount of emulsifying agent required to form a stable emulsion ordinarily ranges from between about 0.5% to about 3% by weight of the emulsion. Usually a 1% by weight of emulsifier is adequate to form a stable emulsion without having an excess of emulsifier.

The amount of water in the emulsion is not critical, the minimum amount being dictated by the point at which the emulsion becomes very viscous and difficult to handle, the maximum amount of water depending upon how thin a film is desired. The viscosity of the emulsion coating is not important except from a practical standpoint. For example, if viscosity is too high, the coating composition becomes very difficult to work with and if the viscosity is too low the resulting coating of the food product is very thin. Ordinarily the viscosity ranges from 25 to 50 centipoises. However, the invention is in no way limited to such viscosity. Ordinarily the percentage by weight of water may range from 22% to about 84.5% of the overall composition, depending on the overall proportions of the other components and the type of coating which is desired. A preferable range is from about 25% to about 60% and a preferred amount is about 50%. In the event that the resin is acidic and must be rendered neutral or slightly basic in order to give increased stability and decreased toxicity to the emulsion, any basic compound other than the ammonia solution referred to in the example may be used so long as it does not produce an appreciably ionized compound and so long as it is not used in such quantity as will impart toxicity to the coated product.

The coating emulsion of the present invention may be modified as to properties by the addition of colloidal thickeners, such as carboxy-methyl-cellulose, hydroxethyl cellulose, as disclosed in Example I, polyvinyl alcohol, as disclosed in Example II, or any other known colloidal thickener, which is not toxic, by the addition of stabilizers, such as calcium oleate, calcium stearate, magnesium phosphate and mold retarders such as calcium propionate and by the addition of dyes or pigments, etc., depending upon the type of coating desired. When colloidal thickeners are used, they are usually used in proportion of approximately ½% by weight of the total emulsion. However, the use of colloidal thickeners is not essential to the practice of the present invention. The use of thickeners or the reduction of the water content of the emulsion produces a thicker film, which may be desirable for some uses. Some loss of transparency occurs as the thickness of the film is increased.

One of the advantages of the coating material here described is that it can be consolidated to form a transparent film on the food at moderate temperatures and within a short enough time so that the food is not changed in appearance and character. Another advantage is the low toxicity of the emulsion. Any liquid coating which is applied to food penetrates to some extent, so that the use of an emulsion which is toxic in its liquid state is prohibited. Practically all of the resinous compositions previously used for coating are toxic in liquid form. Some are non-toxic in their dry and solid states, and are used to form sheet material for wrapping foods, but even this cannot be applied to food products as liquid coatings because of their toxicity in liquid form. None of the components of the composition here described is appreciably toxic or imparts toxicity to food with which the coating comes in contact.

The coating composition here described is particularly useful for coating smoked and prepared meats such as sausages, bologna, frankforts, and liverwurst. Foods such as bologna and liverwurst are frequently cooked in a relatively impervious wrapper. Even these wrappers, however, are not sufficiently air and moisture-proof to preserve the product for long periods. The coating here described, when applied to the food over such wrappers, seals the food, with the advantages previously described. Smoked meats such as sausage must be prepared in relatively porous casings to allow the smoke to penetrate. The coating may be advantageously applied over such casings to seal the pores and protect and preserve the food.

In sausage products the ends of the porous casing are usually wrinkled where the casing is pinched together and the small amounts of resin accumulating in these wrinkles is thicker than it is around the bulk of the product. Consequently, it has a whitish, cloudy appearance. The term "substantially transparent coating" as used herein is intended to include coatings having these minute, cloudy accumulations in the wrinkles at the ends of the product.

We claim:

1. A coated food product having a substantially continuous, cast coating comprising the dried, consolidated residue of an aqueous emulsion of a water insoluble solid vinylidene resin plasticized with a plasticizer of low toxicity, the proportion of said plasticizer to said resin ranging from about 1 part of plasticizer to between about 2.5 and about 9.0 parts of resin, said coating adhering to, completely enclosing, and closely conforming to, the external contour of the food product.

2. A coated food product having a substantially continuous, substantially transparent and cast coating adhered thereto and comprising the dried, consolidated residue of an aqueous emulsion of a water insoluble, solid resinous copolymer of a vinylidene chloride and another vinylidene compound plasticized with a plasticizer of low toxicity, the proportion of said plasticizer to said copolymer being about 1 part plasticizer to between about 2.5 and 9.0 parts of copolymer.

3. A coated food product having a substantially continuous, substantially transparent, cast coating adhered thereto and comprising the dried, consolidated residue of a dried aqueous emulsion of a solid, water insoluble, resinous copolymer of a vinylidene chloride and one of the group consisting of an unsubstituted and a lower alkyl alpha substituted vinyl cyanide, plasticized with a plasticizer of low toxicity, the proportion of said plasticizer to said copolymer being one part plasticizer to between about 2.5 and 9.0 parts copolymer.

4. A coated food product according to claim 3 wherein the lower limit of the amount of said plasticizer is about 1 part plasticizer to about 4.5 parts copolymer.

5. The product of claim 4, wherein said food product comprises a sausage product.

6. The food product of claim 5 wherein said sausage product has a porous casing, said coating closing the pores of said casing.

7. A coated food product according to claim 4 wherein said copolymer comprises a resinous copolymer of 1,1 dichloroethylene and acrylonitrile.

8. A coated food product according to claim 7 wherein said copolymer is a copolymer of from about 70% to about 90% 1,1 dichloroethylene and from 10% to about 30% acrylonitrile.

9. A product as described in claim 8, wherein said proportion of plasticizer ranges from about one part of plasticizer to between about 3.0 and 4.5 parts of copolymer.

10. A product as described in claim 8, the coating completely enclosing, and closely conforming to the external contour of, the food product.

11. A coated prepared meat product according to claim 8 wherein said plasticizer comprises at least one of the group consisting of ethyl phthalyl ethyl glycolate, p-tertiary butyl phenyl salicylate, 3-(2-xenoxy) 1,2-epoxypropane, 2-ethylhexyl diphenyl phosphate, butyl phthalyl butyl glycolate, glycerol monooleate, acetyl tributyl citrate, di-isobutyl adipate, butyl stearate, glycerol, di-butyl sebacate, sorbitol and any combination thereof.

12. The product of claim 11, wherein the proportion of said plasticizer to said copolymer is from about 1 part of plasticizer to between about 3.0 and 4.5 parts of copolymer.

13. The product of claim 11, where in said plasticizer comprises 2-ethylhexyl diphenyl phosphate.

14. The product of claim 12, wherein said product comprises a sausage product having a porous casing.

15. A product in accordance with claim 11 wherein said plasticizer comprises di-isobutyl adipate.

16. A product in accordance with claim 11 wherein said plasticizer comprises di-butyl sebacate.

17. A product in accordance with claim 11 wherein said plasticizer comprises a mixture of 2-ethylhexyl diphenyl phosphate and di-isobutyl adipate.

18. A product in accordance with claim 11 wherein said plasticizer comprises 2-ethylhexyl diphenyl phosphate and dibutyl sebacate.

19. A product in accordance with claim 11, wherein said plasticizer comprises a mixture of di-isobutyl adipate and di-butyl sebacate.

20. A coating composition for coating food products, said composition comprising an aqueous emulsion a copolymer of a vinylidene chloride and one of the group consisting of an unsubstituted and a lower alkyl alpha substituted vinyl cyanide, plasticized with a plasticizer of low toxicity, the upper limit of the amount of said plasticizer being about 1 part plasticizer to about 2.5 parts copolymer and the lower limit being about 1 part plasticizer to about 4.5 parts of copolymer, the percentage by weight of water in said emulsion being between 22% and about 84.5%.

21. The coating composition of claim 20, wherein said copolymer is a copolymer of from about 70% to 90% of 1,1 dichloroethylene and from about 10% to 30% of acrylonitrile.

22. The coating composition of claim 20, wherein said plasticizer comprises at least one of the group consisting of ethyl phthalyl ethyl glycolate, p-tertiary butyl phenyl salicylate, 3-(2-xenoxy) 1,2-epoxypropane, 2-ethylhexyl diphenyl phosphate, butyl phthalyl, butyl glycolate, glycerol monooleate, acetyl tributyl citrate, di-iso butyl adipate, butyl stearate, glycerol, dibutyl sebacate, sorbitol and any combination thereof.

23. The coating composition of claim 20, wherein said plasticizer comprises 2-ethylhexyl diphenyl phosphate and the proportion of said plasticizer to said copolymer is from about 1 part of plasticizer to between about 3 parts and 4.5 parts of copolymer.

24. The coating composition of claim 20, wherein said plasticizer comprises from about 45% to 65% by weight of total plasticizer, of 2-ethylhexyl diphenyl phosphate and from about 35% to 55% by weight of total plasticizer, of di-isobutyl adipate.

25. The coating composition of claim 20, wherein said plasticizer comprises from about 45% to 65% by weight of total plasticizer, of 2-ethylhexl diphenyl phosphate and from about 35% to 55% by weight of total plasticizer, of dibutyl sebacate.

26. A coating composition in accordance with claim 20, wherein said plasticizer comprises di-isobutyl adipate.

27. A coating composition in accordance with claim 20, wherein said plasticizer comprises di-butyl sebacate.

28. A coating composition in accordance with claim 20, wherein said plasticizer comprises a mixture of 2-ethylhexyl diphenyl phosphate and di-isobutyl adipate.

29. A coating composition in accordance with claim 20, wherein said plasticizer comprises a mixture of 2-ethylhexyl diphenyl phosphate and di-butyl sebacate.

30. A coating composition in accordance with claim 20, wherein said plasticizer comprises a mixture of di-isobutyl adipate and di-butyl sebacate.

References Cited in the file of this patent

UNITED STATES PATENTS

| | | |
|---|---|---|
| 2,538,002 | Irons et al. | Jan. 16, 1951 |
| 2,538,737 | Stanton et al. | Jan. 16, 1951 |
| 2,556,278 | Irvine | June 21, 1951 |
| 2,570,478 | Pitzl | Oct. 9, 1951 |
| 2,593,236 | Young et al. | Apr. 15, 1952 |
| 2,611,708 | Owens et al. | Sept. 23, 1952 |
| 2,662,064 | Mead | Dec. 8, 1953 |
| 2,663,696 | Armatys | Dec. 22, 1953 |
| 2,686,726 | Grantham | Aug. 17, 1954 |

FOREIGN PATENTS

| | | |
|---|---|---|
| 665,479 | Great Britain | Jan. 23, 1952 |

UNITED STATES PATENT OFFICE
CERTIFICATE OF CORRECTION

Patent No. 2,849,319                 August 26, 1958

Ritchard C. Weinmann et al.

It is hereby certified that error appears in the printed specification of the above numbered patent requiring correction and that the said Letters Patent should read as corrected below.

Column 7, line 13, for "comprising an" read -- comprising in --.

Signed and sealed this 13th day of January 1959.

(SEAL)

Attest:
KARL H. AXLINE
Attesting Officer

ROBERT C. WATSON
Commissioner of Patents